Figure 1:
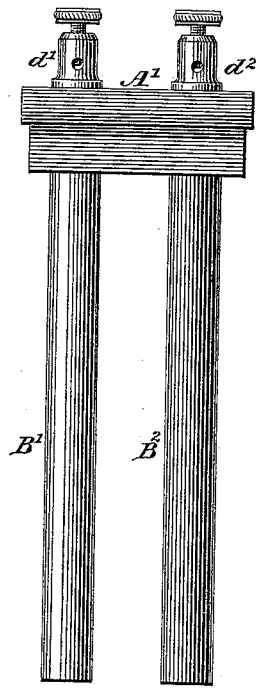

(No Model.) 2 Sheets—Sheet 1.

O. C. FLICK.
SECONDARY BATTERY.

No. 370,134. Patented Sept. 20, 1887.

Witnesses
Geo. W. Breck.
Carrie E. Ashley

Inventor
Otis C. Flick,
By his Attorneys
Pope & Edgecomb (No Model.) 2 Sheets—Sheet 2.

O. C. FLICK.
SECONDARY BATTERY.

No. 370,134. Patented Sept. 20, 1887.

Witnesses
Geo. W. Breck
Carrie E. Ashley

Inventor
Otis C. Flick,
By his Attorneys
Pope & Edgecomb

UNITED STATES PATENT OFFICE.

OTIS C. FLICK, OF BROOKLYN, ASSIGNOR TO THE DOANE AND WELLINGTON MANUFACTURING COMPANY, OF NEW YORK, N. Y.

SECONDARY BATTERY.

SPECIFICATION forming part of Letters Patent No. 370,134, dated September 20, 1887.

Application filed April 22, 1885. Renewed January 21, 1887. Serial No. 225,007. (No model.)

*To all whom it may concern:*

Be it known that I, OTIS C. FLICK, a citizen of the United States, residing at Brooklyn, in the county of Kings and State of New York, have invented certain new and useful Improvements in Secondary or Storage Batteries, of which the following is a specification.

The invention relates to the class of apparatus employed for storing or accumulating electricity or electrical energy in such manner that it may be available for use in regulated quantities whenever desired.

It is well known that when an electric current is passed from one conducting-plate to another through a liquid electrolyte, hydrogen is evolved at one of the plates and oxygen at the other, and if the gases thus evolved be allowed to accumulate a counter electro-motive force will be set up, tending to produce an electric current in the direction opposite to that first established. The greater the quantity of the gases retained upon the surface of the plates the longer will be the duration of the secondary current when it is allowed to act. For the purpose of affording the most favorable conditions for the retention of the gases, lead plates have been employed in an electrolyte of dilute sulphuric acid. The surfaces of these plates, by the repeated operation of charging and discharging by an electric current, assume a porous or spongy state, and when in this condition the charging-current converts one plate into a peroxide of lead, while the other remains in a metallic state. Owing to the difficulty arising from the length of time required to prepare the plates, which is accomplished by charging them by alternate currents, it has been proposed to coat them with a paste of red lead or minium. When a current is passed from one plate thus prepared to the other, the hydrogen or cathode plate is reduced to the metallic state, while the red lead upon the other plate is gradually converted to the brown oxide or peroxide of lead. After cells of this character have been in use for a time it is found that there is formed between the oxygen-plate or anode and its coating a layer or film of the sulphate of lead. This gradually increases the internal resistance of the battery, and thereby correspondingly lessens its efficiency, until at length it renders it absolutely useless. It also loosens the coating, causing it to separate from the plate, so that the two frequently fall apart. It has been proposed in some instances to employ carbon plates in lieu of lead plates; but the formation of a carbonate of lead upon their surfaces from the oxidation of the carbon plates between the plates and the coatings gives rise to essentially the same defects.

The object of the present invention is to provide a storage-battery which may be operated indefinitely without the formation in the plates of any intervening film or layer of resisting material, and which do not deteriorate by continued use.

The invention consists, generally, in constructing a battery in substantially the following manner: Two lead plates are employed, one being designed to serve as the hydrogen and the other as the oxygen plate. These are first immersed in an electrolyte consisting of a dilute sulphuric acid containing in solution an amalgam of zinc and mercury. The plates are "tanned" or repeatedly charged and discharged while thus immersed in the electrolyte, in the usual manner, until the surface of the oxygen-plate is converted to a peroxide of lead with a mixture of sulphur. The presence of the sulphur is readily detected in a plate which has been prepared in this manner. The manner in which it is formed is probably as follows: Upon the breaking up of the salts the sulphur and oxygen are liberated, and, whether they are separated from each other or are still united with each other, they immediately attack the plate, which also in this manner takes on sulphur. The surface of the hydrogen-plate meanwhile will be converted into an amalgam of zinc and mercury combined with lead and hydrogen. Each of the plates thus prepared is placed in a suitable porous cell and surrounded by a close packing of active material. The material used for packing consists of red lead, which is preferably mixed with red oxide of mercury, although the mercury is not always necessary. The composition used is preferably made into a paste by moistening it with water. When the plates have been thus packed in the porous cells, they are placed in a suitable water-tight receptacle, and the electrolyte is also placed in this receptacle. The electrolyte employed is the same in character as that used in first preparing the plates. The porous cells into which the plates are packed may be either porous earthenware, perforated rubber, or similar material surrounded by a covering of filter-paper, cloth, or of any suitable material adapted to securely hold the active material. The object of these cells is to render it possible to pack the active material securely about the plates, rendering the packing hard and compact, and to hold it in position so that it cannot crack off or become separated from the plates. The material becomes very hard and compact when the cells are charged. It should be noticed, however, that the plates may be used as a storage-battery with very good effect in the condition in which they are at the end of the first step of the process—that is to say, without the application of the packing of active material. A very strong current may be obtained from such a battery—such, for instance, as is required for cautery purposes. When the plates have been properly packed and placed in their receptacles, they are charged in the ordinary manner. The plates take on the additional coating of red lead, or red lead and red oxide of mercury, which is homogeneous with that first applied thereto, and presents no marked dividing-line between the metallic lead and the coating. The presence of the sulphate of zinc and mercury in the electrolyte renders it a better electrical conductor, and thus lessens the resistance of the battery. The amalgam prevents the gases from being given off at the hydrogen-plate, as the zinc and mercury and lead combined readily absorb hydrogen and prevent resistance which it would otherwise occasion, as well as the loss of electricity in charging. The acid cannot act upon the peroxide or the brown oxide of lead, but it will attack either metallic lead or the protoxide and form a sulphate. Now, in the usual forms of batteries, the metallic lead, by contact with the red oxide, reduces the latter to a protoxide, and thus there is afforded an opportunity for the formation of the intervening layer of sulphate of lead. The previous treatment of the plates according to the process herein described prevents the reduction of the higher oxide of lead to the protoxide, and there is thus no opportunity for the formation of the sulphate.

The proportions which I have found very efficient are approximately as follows: In preparing the lead plates, a saturated solution of zinc and mercury in a solvent of equal proportions of sulphuric acid and water is first prepared. About ten per cent. of this solution and twelve and one-half per cent. of sulphuric acid are added to seventy-seven and one-half per cent. of water. The plates are prepared in this solution until the surfaces are reduced to the required condition. They are then placed in the cells, and about five per cent. of the red oxide of mercury is mixed with ninety-five per cent. of red lead, (minium,) and this compound is packed about the plate or plates in the porous cells or receptacles by being wet, and settled with them in a solid adhering mass.

In charging the batteries, if the oxygen-plate and hydrogen-plate are of equal superficial area, the hydrogen-plate absorbs a greater quantity of hydrogen than is an equivalent of the oxygen retained by the oxygen-plate. By making the oxygen-plate of greater area it is possible to equalize the capacities of the two plates or sets of plates. A greater quantity of electricity may then be obtained from the batteries, as well as a current of greater strength. I prefer, however, when currents of high electro-motive force are required, instead of enlarging the oxygen-plate, to employ two oxygen-plates for each hydrogen-plate, one on each side of the hydrogen-plate. In discharging the battery the oxygen is given off more rapidly than the hydrogen, and therefore when the battery is being discharged a zinc plate may be inserted. This plate is inserted after the battery is charged and at time of using only. This last-named construction is of special importance when very strong currents are desired—for instance, for cautery purposes. The zinc plate not only serves to furnish the additional hydrogen required, but there is also established in the cell a chemical action similar to that of a primary battery—that is to say, the zinc plate not only acts in aid of the hydrogen-plate for the secondary battery, but it also acts like the positive electrode of a primary battery, and the combined effects of the two classes of currents are thus secured.

Figure 2:
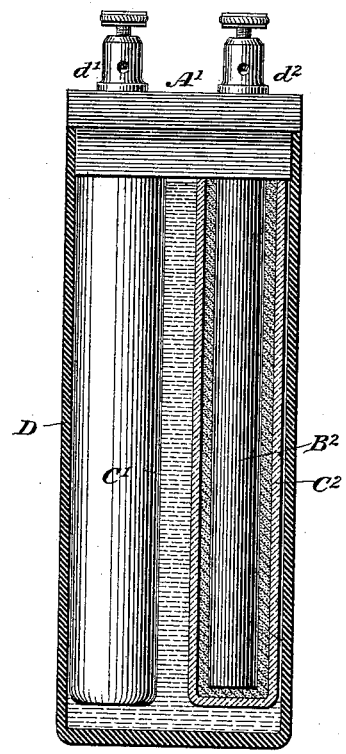
Figure 3:
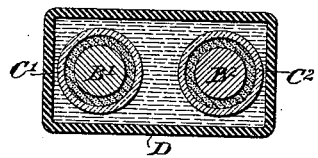
Figure 4:
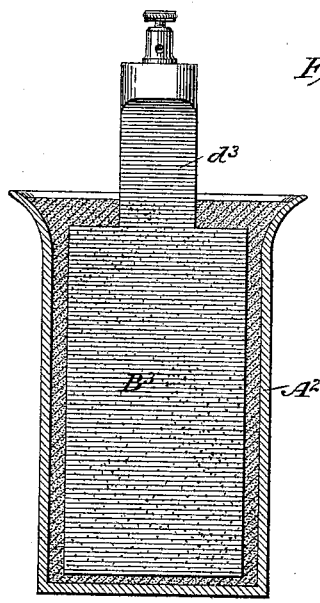

In the accompanying drawings, Figure 1 is an elevation of two battery-plates, which have been prepared previous to their insertion in the cup; and Fig. 2 is a transverse, and Fig. 3 a horizontal section, showing the plates packed in the cells and charged. Fig. 4 illustrates a different form of plate, and Fig. 5 illustrates the method of employing an additional hydrogen or zinc plate in discharging the cells.

Referring to Figs. 1, 2, and 3, A' represents a suitable insulating-support for the plates B' and B². This support constitutes also a cover for the containing cell or cup D. The plates B' and B² are of lead, and may be either solid rods or hollow tubes. They are connected, respectively, with the binding-posts $d'$ and $d^2$ at their upper ends.

When the plates are first prepared, by being placed in the electrolyte of sulphuric acid and zinc amalgam, the oxygen-plate assumes a light brownish appearance, owing to the formation of the peroxide, and it usually increases somewhat in size. The zinc amalgam combines to a greater or less extent with the hydrogen-plate and gives it a dull metallic appearance. When a sufficient foundation has been prepared upon the plates, they are inserted into separate porous cells, C' and C², and packed with the active material, consisting, preferably, of red oxide of mercury mixed with the red oxide of lead. The red oxide of mercury may, however, be omitted. The oxygen and the hydrogen plates having been packed in this manner in separate porous cells, both cells are placed in a vessel containing an electrolyte. This consists either of dilute sulphuric acid, or of such acid containing a solution of zinc amalgam.

Figure 5:
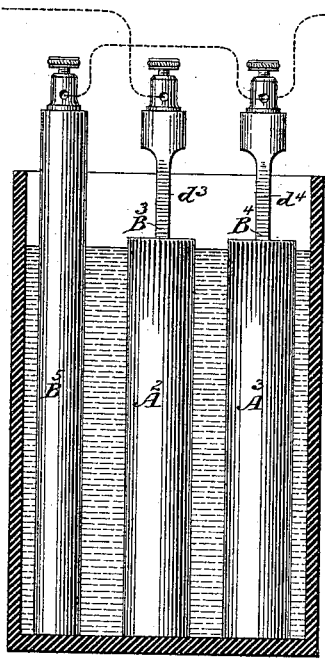

In Figs. 4 and 5 an organization is illustrated in which flat plates $B^3$ and $B^4$ are employed instead of cylindrical plates. They are first reduced or prepared in the manner described with reference to the plates $B'$ and $B^2$. They are respectively packed in suitable porous cups or cells, $A^2$ and $A^3$, which may be of earthenware, perforated hard rubber, or other suitable material. The oxides of mercury and lead are packed in the cells with the plates, and cover their tops. The cells are preferably sealed at the upper ends to prevent the access of air. The ends or strips $d^3$ and $d^4$ are preferably coated with shellac or other suitable material to prevent them from oxidizing when the plates are being charged.

There is shown in Fig. 5 a zinc plate, $B^5$, which may be coupled with the hydrogen-plate $B^4$ when the battery is being discharged. This plate furnishes the hydrogen which is required, in addition to that contained by the plate $B^4$, to equalize the oxygen of the plate $B^3$, and also establishes a primary current between the plate $B^3$ and itself. It is preferred to place the oxygen-plate $B^3$ between the hydrogen-plate $B^4$ and the zinc plate $B^5$, for by this arrangement both surfaces of the oxygen-plate will be more directly exposed to the hydrogen-plates. It is evident that an additional hydrogen-plate, similar to the plate $B^4$, may be employed in the place of the zinc plate. In either case it is preferred to connect the two hydrogen-plates with each other to form one pole while the oxygen-plate forms the other, as shown.

I claim as my invention—

1. In a storage-battery, an oxygen-plate consisting of the peroxide of lead, and a hydrogen-plate consisting of an amalgam of zinc, mercury, and lead.

2. The combination, substantially as hereinbefore set forth, in a storage-battery, with a lead plate having a surface of zinc and mercury combined with lead and hydrogen and an oxidized lead plate, of a packing of active material about each plate, which has been formed in a rigid porous cell.

3. The combination, substantially as hereinbefore set forth, of a hydrogen-plate, an oxygen-plate, and a mass of active material about each of said plates, consisting of a composition of red oxide of mercury and the peroxide of lead.

4. The combination, substantially as hereinbefore set forth, of an oxygen-plate, a hydrogen-plate, a porous cell for each of said plates, a packing of active material about each of said plates within the corresponding cells, and an electrolyte consisting of dilute sulphuric acid containing in solution an amalgam of mercury and zinc.

5. The combination, substantially as hereinbefore set forth, in a storage-battery, of an oxygen-plate, a hydrogen-plate, a mass of active material surrounding each plate and consisting of a composition of red oxide of mercury and peroxide of lead, and an electrolyte consisting of dilute sulphuric acid containing in solution zinc and mercury.

6. The combination, substantially as hereinbefore set forth, of an oxygen-plate, a hydrogen-plate, each consisting of a form of lead or lead compound, and an additional plate of zinc serving to furnish hydrogen for the surplus oxygen from the oxygen-plate.

7. In a storage-battery, a hydrogen-plate consisting of an amalgam of zinc, mercury, and lead.

8. In a storage-battery, the combination of a hydrogen-plate and two oxygen-plates.

In testimony whereof I have hereunto subscribed my name this 18th day of April, A. D. 1885.

OTIS C. FLICK.

Witnesses:
CARRIE R. DAVIDSON,
CHARLES A. TERRY.